US012600162B2

(12) United States Patent
Vasconcelos

(10) Patent No.: US 12,600,162 B2
(45) Date of Patent: Apr. 14, 2026

(54) SUPPORT SYSTEM, BOARD WITH SURFACE CONFIGURED FOR WRITING AND RELATED PREPARATION METHOD

(71) Applicant: BI-SILQUE, S.A., Esmoriz (PT)

(72) Inventor: André Vasconcelos, Ovar (PT)

(73) Assignee: BI-SILQUE, S.A., Esmoriz (PT)

( * ) Notice: Subject to any disclaimer, the term of this patent is extended or adjusted under 35 U.S.C. 154(b) by 8 days.

(21) Appl. No.: 18/837,872

(22) PCT Filed: Feb. 14, 2023

(86) PCT No.: PCT/PT2023/050004
§ 371 (c)(1),
(2) Date: Aug. 12, 2024

(87) PCT Pub. No.: WO2023/158328
PCT Pub. Date: Aug. 24, 2023

(65) Prior Publication Data

US 2025/0033404 A1 Jan. 30, 2025

(30) Foreign Application Priority Data

Feb. 18, 2022 (PT) ........................................ 117796

(51) Int. Cl.
*B43L 5/02* (2006.01)
*A47B 97/04* (2006.01)

(52) U.S. Cl.
CPC ................ *B43L 5/02* (2013.01); *A47B 97/04* (2013.01)

(58) Field of Classification Search
CPC .................................. B43L 5/02; A47B 97/04
(Continued)

(56) References Cited

U.S. PATENT DOCUMENTS 414,987 A * 11/1889 McDonald ............. A47B 97/08 248/449
639,857 A * 12/1899 Loan .................... A47B 23/042 248/278.1
(Continued)

FOREIGN PATENT DOCUMENTS

CN 211138808 U 7/2020
KR 100832777 B1 5/2008

OTHER PUBLICATIONS

PCT International Search Report for International Application No. PCT/PT2023/050004, mailed Jun. 5, 2023, 3pp.
(Continued)

*Primary Examiner* — Muhammad Ijaz
(74) *Attorney, Agent, or Firm* — The Roy Gross Law Firm, LLC; Roy D. Gross

(57) ABSTRACT

The invention refers to a support system for a board with surface configured for writing comprising a tripod (1), three tethers (3) and a connector (4); a tray (2), which includes at least one tripod connection element (1); a clamp (7) configured to connect with said board with surface configured for writing; and a guide rail (19), which is configured to connect to said clamp (7). The invention also refers to a board with surface configured for writing connected to said support system and the associated preparation method.
The guide rail enables the use of sheets of paper sized larger than the board. The invention may be furnished with individualized components, facilitating the replacement or acquisition of individual parts.

15 Claims, 8 Drawing Sheets

(58) Field of Classification Search
USPC ..... 248/411, 441.1, 444, 451, 460, 464, 465
See application file for complete search history.

(56) References Cited

U.S. PATENT DOCUMENTS

| | | | | | |
|---|---|---|---|---|---|
| 2,550,550 | A * | 4/1951 | Goodstein | A47B 97/08 248/452 | |
| 2,553,890 | A * | 5/1951 | Bloch | F16M 11/42 248/188.7 | |
| 3,145,966 | A * | 8/1964 | Landon | A47B 97/08 108/115 | |
| 3,370,821 | A * | 2/1968 | Mingis | A47B 97/04 248/463 | |
| 4,852,836 | A * | 8/1989 | Kawazoe | F16M 13/00 248/188.8 | |
| 5,125,613 | A * | 6/1992 | Albee, Jr. | A47B 97/08 248/463 | |
| 5,624,097 | A * | 4/1997 | Potter | A47B 97/08 280/47.24 | |
| 5,713,553 | A * | 2/1998 | Cooper | A47B 19/08 248/188.7 | |
| 5,791,624 | A * | 8/1998 | Fedrick | A47B 19/002 248/441.1 | |
| 5,899,429 | A * | 5/1999 | McCloud | A46B 17/06 248/312.1 | |
| 5,979,856 | A * | 11/1999 | Hsu | A47B 19/002 248/460 | |
| 6,017,011 | A * | 1/2000 | Lee | A47B 19/002 248/113 | |
| 6,179,266 | B1 * | 1/2001 | Hutten | A47B 97/08 248/440 | |
| 6,193,204 | B1 * | 2/2001 | Hsu | A47B 19/002 248/460 | |
| 6,536,720 | B1 * | 3/2003 | Yu | F16M 11/10 248/185.1 | |
| 6,601,805 | B1 * | 8/2003 | Kapp | A47B 97/08 248/464 | |
| 7,832,701 | B2 * | 11/2010 | Barnes | A47B 97/08 248/463 | |
| D923,344 | S * | 6/2021 | Ni | D6/312 | |
| 2001/0054674 | A1 * | 12/2001 | Turner | A47B 97/04 248/460 | |
| 2003/0178544 | A1 * | 9/2003 | Anderson | A47B 19/002 248/460 | |
| 2005/0017138 | A1 * | 1/2005 | Hardin | F16M 11/42 248/129 | |
| 2006/0060747 | A1 * | 3/2006 | Chun-Ching | A47B 97/08 248/463 | |
| 2006/0175523 | A1 * | 8/2006 | Tai | A47B 19/002 248/460 | |
| 2006/0192071 | A1 * | 8/2006 | Choi | A47B 97/08 248/460 | |
| 2007/0075209 | A1 * | 4/2007 | Kapp | F16M 11/34 248/460 | |
| 2009/0174771 | A1 * | 7/2009 | Royz | G06T 15/20 348/E5.025 | |
| 2014/0291268 | A1 * | 10/2014 | Italiano | B66C 19/02 212/294 | |
| 2015/0374117 | A1 * | 12/2015 | Lozano | F16M 11/14 248/447.2 | |
| 2025/0033404 | A1 * | 1/2025 | Vasconcelos | A47B 97/04 | |

OTHER PUBLICATIONS

PCT Written Opinion for International Application No. PCT/PT2023/050004, mailed Jun. 5, 2023, 7pp.

* cited by examiner

[Fig. 1]
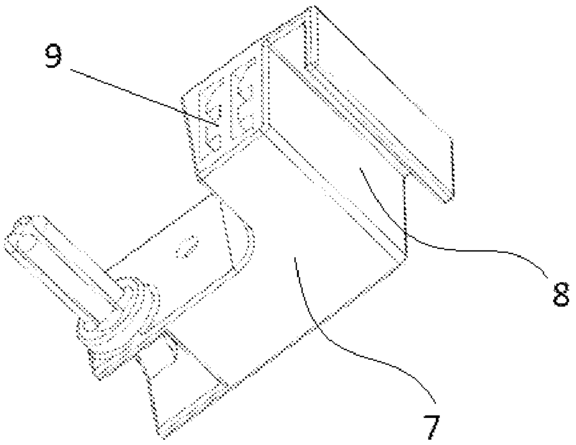
[Fig. 2]
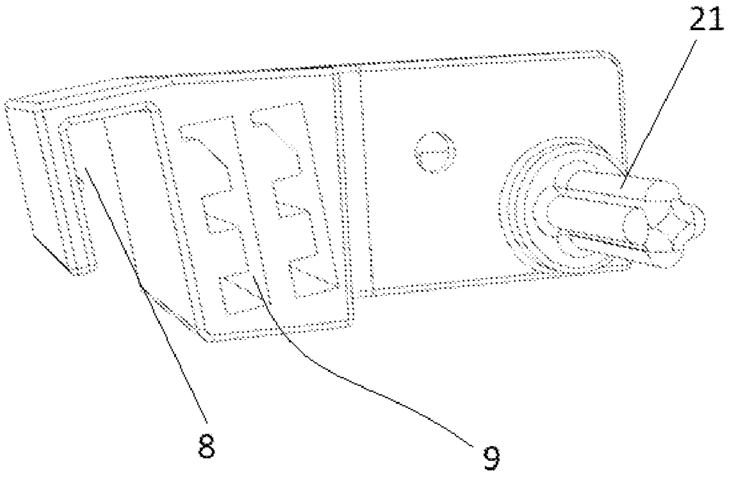

[Fig. 3]
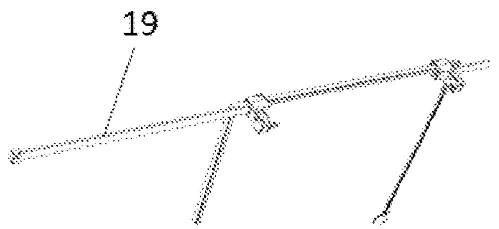
[Fig. 4]
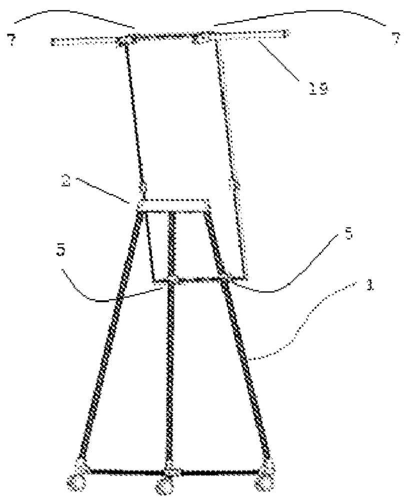
[Fig. 5]
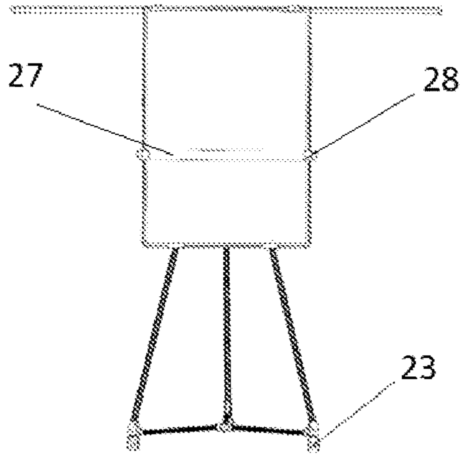

[Fig. 6]
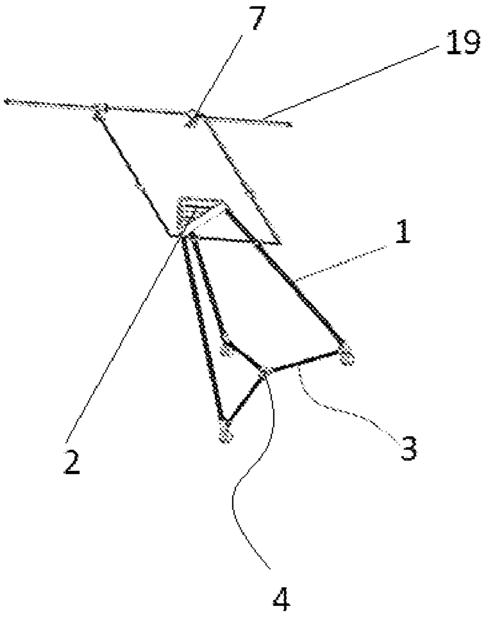
[Fig. 7]
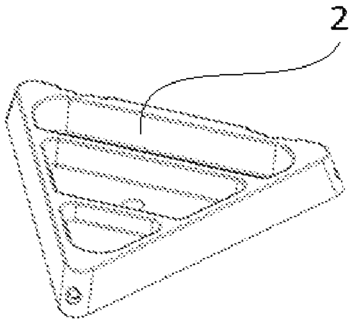

[Fig. 8]
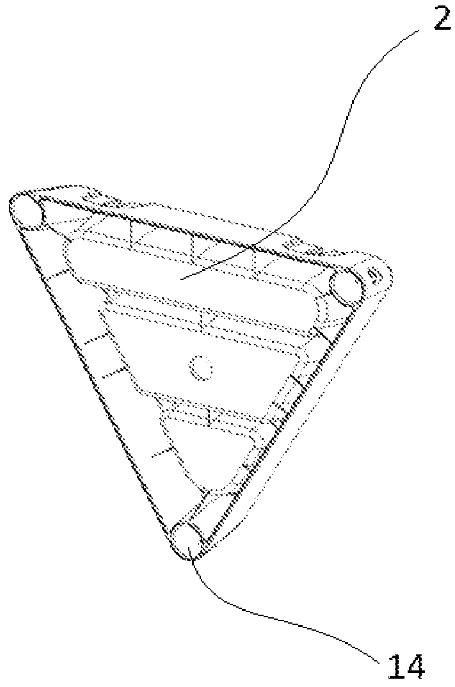
[Fig. 9]
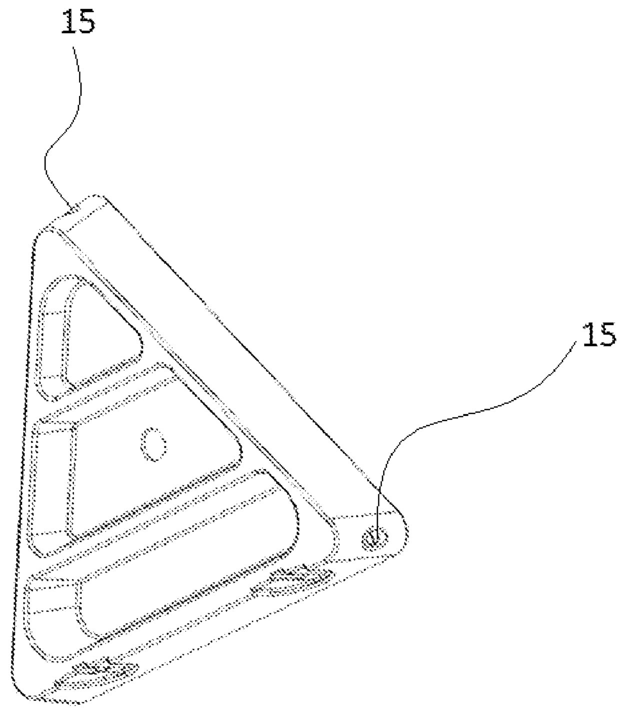

[Fig. 10]
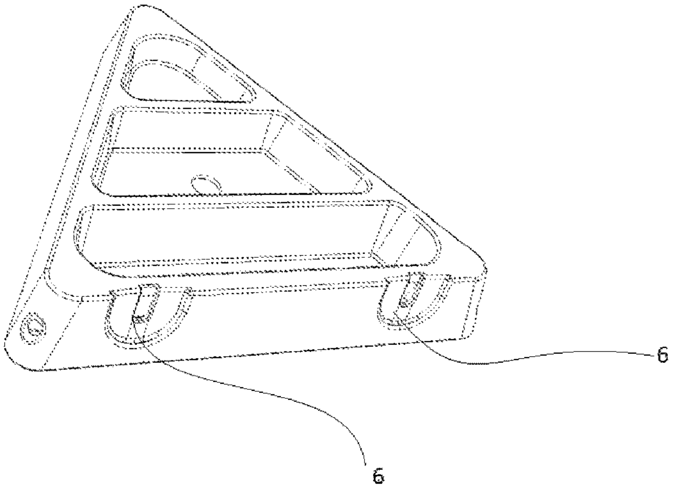
[Fig. 11]
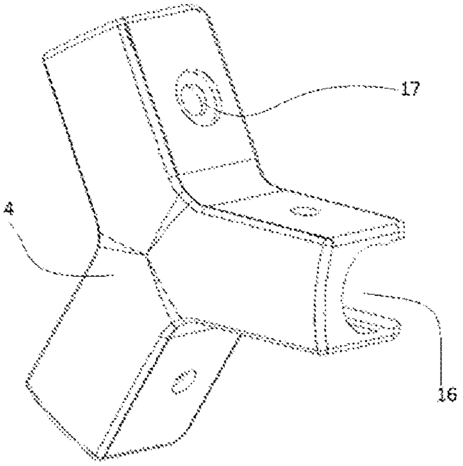
[Fig. 12]
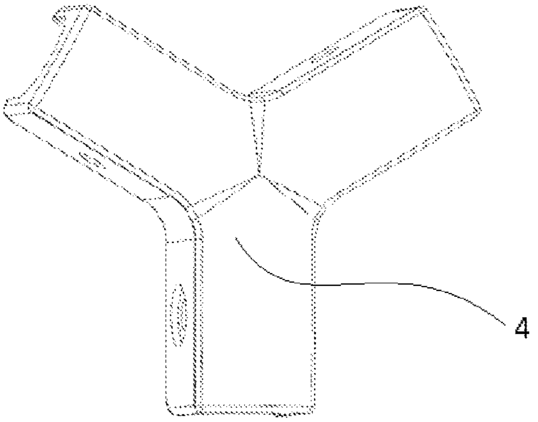

[Fig. 13]
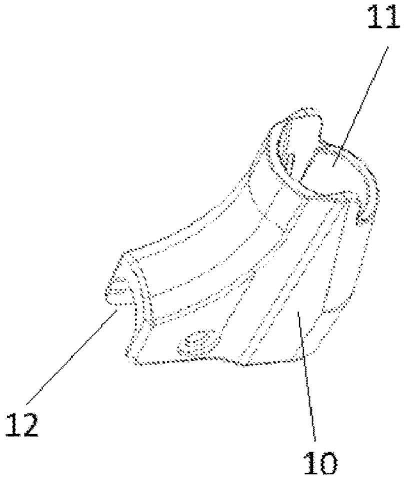
[Fig. 14]
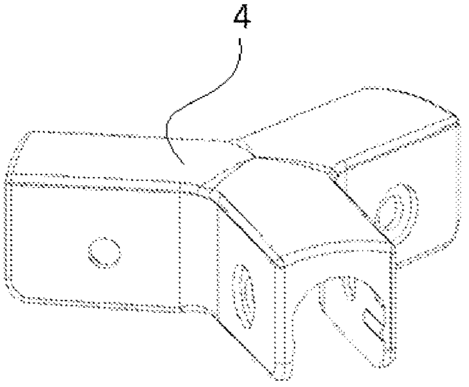
[Fig. 15]
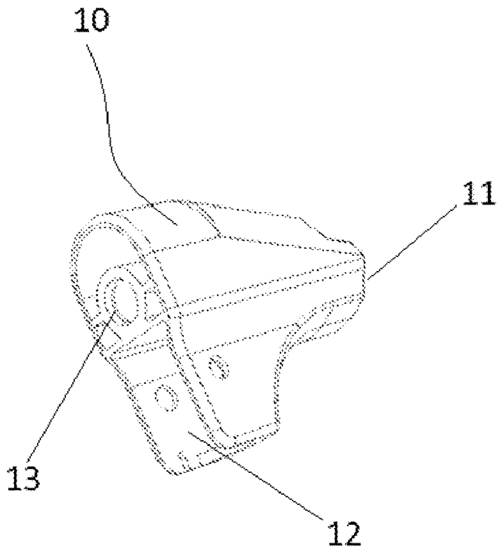

[Fig. 16]
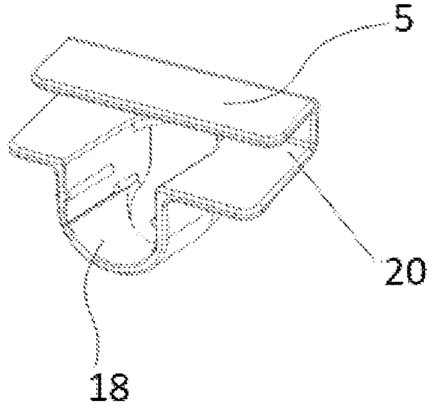
[Fig. 17]
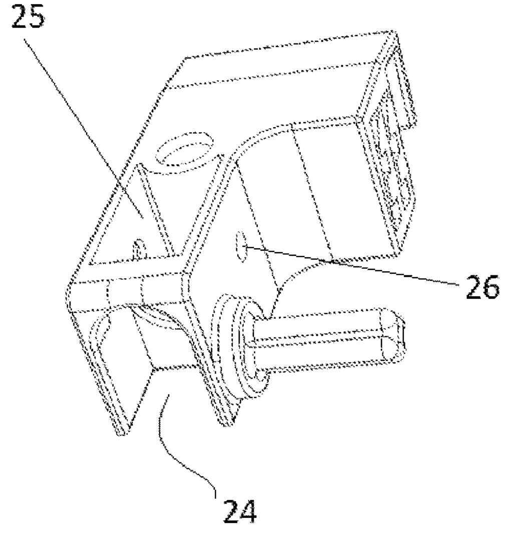
[Fig. 18]
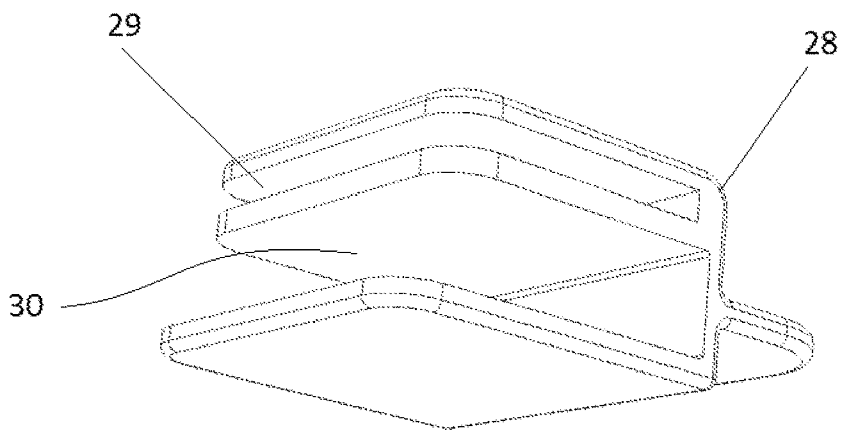

[Fig. 19]
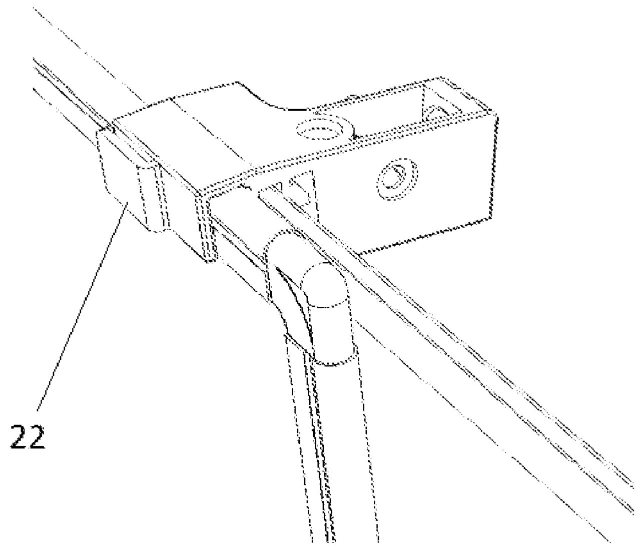

SUPPORT SYSTEM, BOARD WITH SURFACE CONFIGURED FOR WRITING AND RELATED PREPARATION METHOD

CROSS REFERENCE TO RELATED APPLICATIONS

This application is a National Phase of PCT Patent Application No. PCT/PT2023/050004 having International filing date of Feb. 14, 2023, which claims the benefit of priority of Portuguese Patent Application No. 117796, filed Feb. 18, 2022, the contents of which are all incorporated herein by reference in their entirety.

TECHNICAL FIELD

The present invention pertains to a support system for a board with surface configured for writing, to a board with surface configured for writing and to its respective preparation method. The board with surface configured for writing can be, for example, a whiteboard of the type used in offices or classrooms.

BACKGROUND ART

One of the problems associated to whiteboards from the state of the art is their limitation relative to the use of supports for writing, such as sheets of paper, which exceed the dimensions of the whiteboard per se.

Another problem associated with the systems of the state of the art is related to the production of boards composed of non-individualized elements, meaning a whole new system should be acquired by a user, in the event of a defect or malfunction of one of the components comprised within the system.

Solution to Problem

The support system for a board with surface configured for writing solves the problems of the state of the art by incorporating a guide rail (19), which is connected to a clamp (7) which in turn is connected to the board with surface configured for writing, wherein the guide rail enables the use of sheets of paper with sizes greater than the board with surface configured for writing.

Advantageous Effects of Invention

The support system for a board with surface configured for writing enables saving in the manufacturing process and chiefly facilitates the assembly of this type of product. The fact that it can be furnished with the different components individualized and bearing in mind the possibility of assembling each component, it is easy for the user to proceed to replace or acquire the components in a staggered manner.

BRIEF DESCRIPTION OF DRAWINGS

With the aim of promoting an understanding of the principles according to the embodiments of the present invention, reference will be drawn to the embodiments illustrated in the drawings and to the language employed to describe them. In any case, it should be understood that there is no intention of limiting the ambit of the present invention to the content of the drawings. Any subsequent alterations or modifications of the inventive characteristics illustrated herein, as well as any additional applications of the principles and embodiments of the invention illustrated, which would normally occur for one skilled in the art in possession of this specification, are deemed to be within the ambit of the invention claimed.

FIG. 1 illustrates a first schematic representation of the clamp comprised in the support system for a board with surface configured for writing;

FIG. 2 illustrates a second schematic representation of the clamp comprised in the support system for a board with surface configured for writing;

FIG. 3 illustrates a third schematic representation of a guide rail comprised in the support system for a board with surface configured for writing;

FIG. 4 illustrates a first schematic representation of the support system for a board with surface configured for writing;

FIG. 5 illustrates a second schematic representation of the support system for a board with surface configured for writing;

FIG. 6 illustrates a third schematic representation of the support system for a board with surface configured for writing;

FIG. 7 illustrates a first schematic representation of the tray comprised in the support system for a board with surface configured for writing;

FIG. 8 illustrates a second schematic representation of the tray comprised in the support system for a board with surface configured for writing;

FIG. 9 illustrates a third schematic representation of the tray comprised in the support system for a board with surface configured for writing;

FIG. 10 illustrates a fourth schematic representation of the tray comprised in the support system for a board with surface configured for writing;

FIG. 11 illustrates a first schematic representation of the connector comprised in the support system for a board with surface configured for writing;

FIG. 12 illustrates a second schematic representation of the connector comprised in the support system for a board with surface configured for writing;

FIG. 13 illustrates a first schematic representation of the nipple comprised in the support system for a board with surface configured for writing;

FIG. 14 illustrates a third schematic representation of the connector comprised in the support system for a board with surface configured for writing;

FIG. 15 illustrates a second schematic representation of the nipple comprised in the support system for a board with surface configured for writing;

FIG. 16 illustrates a first schematic representation of the support comprised in the support system for a board with surface configured for writing;

FIG. 17 illustrates a third schematic representation of the clamp comprised in the support system for a board with surface configured for writing;

FIG. 18 illustrates a first schematic representation of the supporting part comprised in the support system for a board with surface configured for writing;

FIG. 19 illustrates a fourth schematic representation of the clamp comprised in the support system for a board with surface configured for writing.

DESCRIPTION OF EMBODIMENTS

In a first aspect, the present invention refers to a support system for a board with surface configured for writing comprising:

- a tripod (1), which includes three legs, at least three tethers (3) and a connector (4), wherein a first end of each tether (3) is connected to a leg of the tripod (1) and a second end of each tether (3) is connected to the connector (4), as illustrated in [FIG. 6];
- a tray (2), which includes at least one tripod connection element (1);
- two supports (5), wherein each one of said supports (5) is connected to a leg of the tripod (1) and is configured for the lower support of said board with surface configured for writing;
- a clamp (7), which includes a trough (8) and at least one notched trough (9), wherein the clamp (7) is configured to connect with said board with surface configured for writing by way of the trough (8), as illustrated in [FIG. 1]; and
- a guide rail (19), which is configured to connect to the notched trough (9) of said clamp (7).

In a second aspect, the present invention refers to a board with surface configured for writing characterized by being connected with the support system, according to the first aspect of the invention.

In the preferred embodiments of the present invention, the tray (2) includes at least one entrance (6), which is configured for connecting a support suction cup, wherein said support suction cup is configured for connecting to a rear portion of the board with surface configured for writing.

In the particularly preferred embodiments of the support system for a board with surface configured for writing, a nipple (10) is connected onto a leg of the tripod (1), wherein said nipple (10) comprises a horizontal entrance (11), which is configured for connecting with the first end of the tether (3) by way of a first fastening device, for example a screw or a spring, as illustrated in [FIG. 13].

In the other particularly preferred embodiments, the nipple (10) includes a vertical entrance (12), which is configured for connecting with the lower end of a leg of the tripod (1) by applying pressure, as illustrated in [FIG. 13]. Even more preferably, the nipple (10) includes a lower entrance (13), which is configured for connecting with a wheel (23), as illustrated in [FIG. 15].

In other preferred embodiments of the support system for a board with surface configured for writing, each leg of the tripod (1) is connected to a nipple (10) and wherein each nipple (10) is connected with a first end of the tether (3) and with a wheel (23).

In the particularly preferred embodiments of the system according to the invention, the tray (2) includes three connection elements (14) to the tripod (1), disposed on a lower portion of the vertexes of said tray (2), as illustrated in [FIG. 8]; and three orifices of the tray (15), disposed on a side portion of the vertexes of said tray (2), as illustrated in [FIG. 9]; wherein each connection element (14) is configured to connect with an upper end of a leg of the tripod (1) by way of a spring mechanism, which is inserted into each orifice of the tray (15).

In the particularly preferred embodiments of the system according to the invention, as illustrated in FIGS. 11 and 12, the connector (4) comprises three arms, wherein each arm includes an entrance of the connector (16) and an orifice of the connector (17), wherein each tether (3) is connected to each arm of the connector (4) by inserting the second end of the tether (3) into said entrance of the connector (16) and by fastening the second end of the tether (3) through a second fastening device inserted through said orifice of the connector (17), for example a screw or a spring.

In the particularly preferred embodiments of the system according to the invention, as illustrated in [FIG. 16], each support (5) comprises a support entrance (18) and a rim (20), wherein each one of the support entrances (18) is connected to a leg of the tripod (1) and wherein the rim (20) is configured for inserting and supporting a lower edge of the board with surface configured for writing.

In the particularly preferred embodiments of the system according to the invention, the clamp (7) is configured to connect with an upper portion of said board with surface configured for writing by way of the trough (8).

In other particularly preferred embodiments of the system according to the invention, the clamp (7) comprises a pin (21), as illustrated in [FIG. 2], which is configured to act as a rotary axle for a roll of paper, and a fastener (22), as illustrated in [FIG. 19], which is configured to act as a guide element for at least one sheet of paper. The pin (21) is configured to act as axle so as to enable the roll of paper to be rolled up/unrolled and at one of its ends also comprises a fastener (22) which is configured to act as guide so that the paper can pass through it, as illustrated in [FIG. 19]. Whenever the need arises to use of additional sheets of paper, same can be placed on the sides of the board with surface configured for writing, and accordingly the guide rail (19) is placed such that said sheets of paper can be supported by said guide rail (19), as illustrated in [FIG. 3].

In other particularly preferred embodiments of the system according to the invention, the guide rail (19) is made of metal or metal alloy and is configured to support at least one sheet of paper through a third fastening device. Bearing in mind these materials for preparing the metal guide rail (19), sheets of paper can be supported by placing a fastening device, for example a magnet, a clip or a clamp.

In other embodiments of the support system for boards with surface configured for writing, a clamp (7) comprises a rear entrance (24), an upper entrance (25) and side orifices (26), as illustrated in [FIG. 17]. In this embodiment, a first clamp (7) is connected to a second clamp (7) through a first horizontal tube, which is connected to the rear entrances (24) of the respective first clamp (7) and second clamp (7). In parallel, a third clamp (7) is connected to a fourth clamp (7) through a second horizontal tube, which is connected to the rear entrances (24) of the respective third clamp (7) and fourth clamp (7). Each one of the upper entrances (25) of each one of the four clamps (7) are configured for inserting a wheel (23), which is fastened by way of a fastening pin inserted through the side orifices (26) of each one of the four clamps (7). In this embodiment of four clamps (7) connected through said first horizontal tube and second horizontal tube, the lower edge of a first board with surface configured for writing is connected to the first clamp (7) and to the second clamp (7) through its respective troughs (8). Additionally, the lower edge of a second board with surface configured for writing is connected to the third clamp (7) and to the fourth clamp (7) through its respective troughs (8). Additionally, the upper edges of the first board with surface configured for writing and of the second board with surface configured for writing are connected and joined by a connection element, such as for example a self-adhesive tape. Additionally, a guide rail (19) is configured to connect to the notched trough (9) of at least one of the four clamps (7) comprised in this embodiment.

In other particularly preferred embodiments of the system according to the invention, as illustrated in [FIG. 5], the system includes a supporting rail (27), which is disposed on the front surface of the board with surface configured for writing and is connected simultaneously to each one of the side portions of the board with surface configured for writing by way of a supporting part (28). Even more preferably, as illustrated in [FIG. 18], the supporting part (28) comprises a first groove (29), which is configured for encasing the supporting rail (27); and a second groove (30), which is configured for encasing a side portion of the board with surface configured for writing; wherein the first groove (29) has a width smaller than the width of the second groove (30).

The present invention refers, in a third aspect, to a method of preparing the board with surface configured for writing, according to the second aspect of the invention, comprising the following steps:

a) Connection of the tray (2) to the tripod (1);
b) Connection between a first end of each tether (3) and a leg of the tripod (1) and between a second end of each tether (3) and the connector (4);
c) Connection between the supports (5) and said board with surface configured for writing;
d) Connection between the clamp (7) and said board with surface configured for writing;
e) Connection between the clamp (7) and the guide rail (19).

In the preferred embodiments of the method of preparing the board with surface configured for writing, according to the third aspect of the invention, said method includes a step of connecting a support suction cup, which is connected to a rear portion of the board with surface configured for writing, and at least one entrance (6), which is disposed on the tray (2), as illustrated in [FIG. 10].

Even more preferably, step b) of the method of preparing the board with surface configured for writing has the additional steps of connecting a nipple (10) to a lower end of a leg of the tripod (1) by way of a vertical entrance (12) and by applying pressure, and connecting said nipple (10) with a first end of the tether (3) by way of a horizontal entrance (11) and by way of a first fastening device, for example a screw or a spring. Even more preferably, it includes the additional step of connecting a wheel (23) to the nipple (10) through a lower entrance (13).

In other preferred embodiments of the method of preparing the board with surface configured for writing, according to the third aspect of the invention, said method includes the additional step of connecting a supporting rail (27) simultaneously to each one of the side portions of the board with surface configured for writing by way of a supporting part (28).

As used throughout this patent application, the term "or" is used inclusively as opposed to exclusively, unless the exclusive sense is clearly defined in a specific situation. In this context, a phrase of the type "X uses A or B" should be interpreted as including all pertinent inclusive combinations, for example "X uses A", "X uses B" and "X uses A and B".

As used throughout this patent application, the indefinite articles "a" or "an" should be interpreted generally as "one or more", unless the sense that the singular modality is clearly defined in a specific situation.

As presented in this specification, the terms related to examples should be interpreted with the purpose of illustrating an example of something and not to indicate a preference.

The subject matter described above is furnished as an illustration of the present invention and should not be interpreted in a way that limits it. The terminology used with the purpose of describing specific embodiments, according to the present invention, should not be interpreted in a way that limits the invention. As used in the specification, the interpretation of the definite and indefinite articles, in their singular form, are meant to include their plural forms as well, unless the context of the specification explicitly indicates otherwise. It is understood that the terms "comprise" and "include", when used in this specification, denote the presence of characteristics, elements, components, steps and related operations, but do not exclude the possibility that other characteristics, elements, components, step and operations are covered as well.

All and any alterations, provided they do not modify the essential characteristics of the accompanying claims, should be deemed to be within the ambit of protection of the present invention.

REFERENCE SIGNS LIST

1. A tripod
2. A tray
3. A tether
4. A connector
5. A support
6. An entrance
7. A clamp
8. A trough
9. A notched trough
10. A nipple
11. A horizontal entrance
12. A vertical entrance
13. A lower entrance
14. A connection element
15. An orifice of the tray
16. An entrance of the connector
17. An orifice of the connector
18. A support entrance
19. A guide rail
20. A rim
21. A pin
22. A fastener
23. A wheel
24. A rear entrance
25. An upper entrance
26. A side orifice
27. A supporting rail
28. A supporting part
29. A first groove
30. A second groove

The invention claimed is:

1. A support system for a board with surface configured for writing comprising:

tripod (1), which includes three legs, at least three tethers (3) and a connector (4), wherein a first end of each tether (3) is connected to a leg of the tripod (1) and a second end of each tether (3) is connected to the connector (4);

a tray (2), which includes at least one connection element to the tripod (1);

two supports (5), wherein each one of said supports (5) is connected to a leg of the (1) and is configured for the lower support of said board with surface configured for writing;

a clamp (7), which includes a trough (8) and at least one notched trough (9), wherein the clamp (7) is configured to connect with said board with surface configured for writing by way of the trough (8); and a guide rail (19), which is configured to connect to the notched trough (9) of said clamp (7); and wherein a nipple (10) is connected onto a leg of the tripod (1), wherein said nipple (10) comprises a horizontal entrance (11), which is configured for connecting with the first end of the tether (3) by way of a first fastening device,; and wherein each leg of the tripod (1) is connected to a nipple (10) and wherein each nipple (10) is connected with a first end of the tether (3) and with a wheel (23);

wherein the tray (2) includes at least one entrance (6), which is configured for connecting a support suction cup, wherein said support suction cup is connected to a rear portion of the board with surface configured for writing, and to at least one entrance (6).

2. The support system for a board with surface configured for writing according to claim 1, wherein the nipple (10) includes a vertical entrance (12), which is configured for connecting with the lower end of a leg of the tripod (1) by applying pressure.

3. The support system for a board with surface configured for writing, according to claim 1, wherein the nipple (10) includes a lower entrance (13), which is connected with the wheel (23).

4. The support system for a board with surface configured for writing, according to claim 1, wherein the tray (2) includes three connection elements (14) to the tripod (1), disposed on a lower portion of the vertexes of said tray (2); and three orifices of the tray (15), disposed on a side portion of the vertexes of said tray (2); wherein each connection element (14) is configured to connect with an upper end of a leg of the tripod (1) by way of a spring mechanism, which is inserted into each orifice of the tray (15).

5. The support system for a board with surface configured for writing, according to claim 1, wherein the connector (4) comprises three arms, wherein each arm includes an entrance of the connector (16) and an orifice of the connector (17), wherein each tether (3) is connected to each arm of the connector (4) by inserting the second end of the tether (3) into said entrance of the connector (16) and by fastening the second end of the tether (3) through a second fastening device inserted through said orifice of the connector (17).

6. The support system for a board with surface configured for writing, according to claim 1, wherein each support (5) comprises a support entrance (18) and a rim (20), wherein each one of the support entrances (18) is connected to a leg of the tripod (1) and wherein the rim (20) is configured for inserting and supporting a lower edge of the board with surface configured for writing.

7. The support system for a board with surface configured for writing, according to claim 1, wherein the clamp (7) is configured to connect with an upper portion of said board with surface configured for writing by way of the trough (8).

8. The support system for a board with surface configured for writing, according to claim 1, wherein the clamp (7) comprises a pin (21), which is configured to act as a rotary axle for a roll of paper, and a fastener (22), which is configured to act as a guide element for at least one sheet of paper.

9. The support system for a board with surface configured for writing, according to claim 1, wherein the guide rail (19) is made of metal or metal alloy and is configured to support at least one sheet of paper through a third fastening device.

10. The support system for a board with surface configured for writing, according to claim 1, which is connected to a board with surface configured for writing and includes a supporting rail (27), that is disposed on the front surface of the board with surface configured for writing and is connected simultaneously to each one of the side portions of the board with surface configured for writing by way of a supporting part (28).

11. The support system for a board with surface configured for writing according to claim 10, wherein the supporting part (28) comprises a first groove (29), which is configured for encasing the supporting rail (27); and a second groove (30), which is configured for encasing a side portion of the board with surface configured for writing; wherein the first groove (29) has a width smaller than the width of the second groove (30).

12. A board with surface configured for writing characterized by being connected with the support system, as defined in claim 1.

13. A method of preparing the board with surface configured for writing, as defined in claim 10, characterized by comprising the following steps:

a) Connection of the tray (2) to the tripod (1);

b) Connection between a first end of each tether (3) and a leg of the tripod (1) and between a second end of each tether (3) and the connector (4);

c) Connection between the supports (5) and said board with surface configured for writing;

d) Connection between the clamp (7) and said board with surface configured for writing;

e) Connection between the clamp (7) and the guide rail (19); and wherein the step b) has the additional steps of connecting a nipple (10) to a lower end of a leg of the tripod (1) by way of a vertical entrance (12) and by applying pressure, and connecting said nipple (10) with a first end of the tether (3) by way of a horizontal entrance (11) and by way of a first fastening device; and wherein the method of preparing the board with surface configured for writing includes the additional step of connecting a wheel (23) to the nipple (10) through a lower entrance (13).

14. The method of preparing the board with surface configured for writing according to claim 13, wherein it includes a connection step between a support suction cup, that is connected to a rear portion of the board with surface configured for writing, and at least one entrance (6), which is disposed on the tray (2).

15. The method of preparing the board with surface configured for writing, according to claim 13, which includes the additional step of connecting a supporting rail (27) simultaneously to each one of the side portions of the board with surface configured for writing by way of a supporting part (28).

* * * * *